United States Patent

[11] 3,614,620

[72] Inventor Vivian David
Valley Way, N.J.

[21] Appl. No. 868,683
[22] Filed Oct. 23, 1969
[45] Patented Oct. 19, 1971
[73] Assignee Westinghouse Brake and Signal Company Limited
London, England
[32] Priority Oct. 23, 1968
[33] Great Britain
[31] 50,222/68

[54] INFORMATION TRANSMISSION SYSTEM
3 Claims, 3 Drawing Figs.

[52] U.S. Cl. .......... 325/30, 178/53.1, 178/66
[51] Int. Cl. .......... H04b 1/00
[50] Field of Search .......... 178/53.1, 66, 67, 88; 325/30, 320, 163; 333/179

[56] References Cited

UNITED STATES PATENTS 3,230,457 1/1966 Soffel .......... 325/320
3,363,059 1/1968 Cummins .......... 325/30

*Primary Examiner*—Robert L. Griffin
*Assistant Examiner*—Albert J. Mayer
*Attorneys*—H. A. Williamson, A. G. Williamson, Jr. and J. B. Sotak

ABSTRACT: According to the present invention there is provided an information transmission system in which items of information are transmitted sequentially over a transmission link from one location to another. These items of information are requested at the one location by discrete frequency signals representing a first or a second binary condition and are grouped into words. Each word is separated by a further discrete frequency signal operable on reception at the another location to synchronize a control device at the another location with a control device at the one location.

INFORMATION TRANSMISSION SYSTEM

This invention relates to information transmission systems and relates especially but not exclusively to such systems in which items of information are transmitted sequentially from one location to another.

More specifically, this invention relates to an information transmission system for communication items of information from a transmitting station to a receiving station and including a transmitter having a transmitter output and a receiver. The transmitter includes a first, second, and third discrete signal generating means. The first and second signals are representative of message information, while the third signal is indicative of the start and the end of a message. The discrete signal generating means is electrically controllingly coupled to the transmitter output to provide a transmitted signal having a format comprised of at least two portions consisting of the third discrete signal and one portion consisting of one or more of the first and second discrete signals. The receiver receives the transmitted signal and includes first, second and third discrete signal detecting means, timing means, and decoding means. The decoding means is electrically coupled to the timing means and to the first, second and third discrete signal detecting means to receive the first and second discrete signals from the first, second, and third discrete signal generating means. The decoding means is responsive to the first and second discrete signals from the first, second, and third discrete signal generator means to provide the above-noted message information. The receiving station is maintained in synchronization with the transmitted message information the third discrete signal from the discrete signal generating means, thereby providing maximum signaling within the discrete signal range.

Information transmission systems have been proposed in which items of information are transmitted over a transmission link from one location to another as a series of discrete signal frequencies representing digits "1" or "0" with an intervening frequency to provide stepping information such that the successive transmitted items can be routed to appropriate stores or registers at the another location. The items of information to be transmitted can, for example, be scanned by a suitable electronic counting chain at the one location and the stepping information transmitted over the link can be utilized at the another location to correspondingly step a counting chain at the latter location to route the received items of information to appropriate registers.

It has further been proposed that the items of information, "1" or "0," be represented respectively by frequencies shifted upward or downward from a center frequency and that the center frequency be utilized to provide the stepping information referred to.

Such a system may have certain shortcomings in that within a given transmission, bandwidth, the necessity to provide a stepping signal between each signal representing an item of information imposes a limitation on the scanning rate which can be satisfactorily employed. A similar limitation is imposed by the frequency shift which occurs between each item of information consisting of only half the frequency range between the frequencies representing "1" and "0."

It is therefore an object of this invention to provide a novel information transmission system which provides maximum transmission to reception signaling speed by the synchronization of a control device at a transmitting station with a control device at a receiving station.

Another object of this invention is to provide an improved information transmission system in which synchronizing information does not appear within any portion of the transmitted message by the use of transmitted information independent of transmitted message information.

Yet another object of this invention is to provide a new and improved information transmission system in which synchronization is achieved by the use of a timing circuit which is periodically resynchronized by a discrete frequency.

In order that the present invention may be more clearly understood and readily carried into effect, the same will be further described by way of example with reference to the accompanying drawings.

Figure 1:
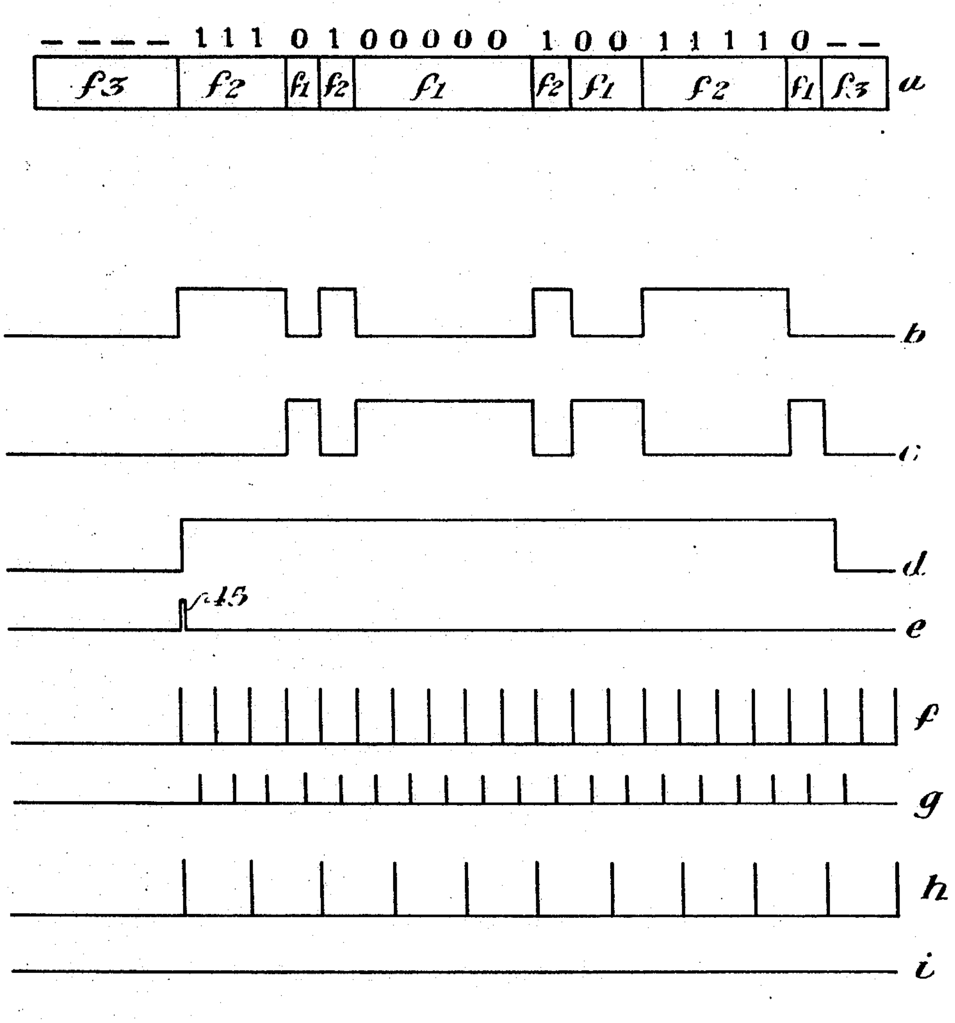
FIG. 1 illustrates graphically the operation of the system to be discussed.

Referring now to the drawings and particularly to FIG. 1, it may be stated at the outset that the preferred embodiment herein set forth employs three frequencies for the transmission between the transmission station and the receiving station. These frequencies will be referred to as discrete frequencies $f1$, $f2$, and $f3$. The frequencies $f1$ and $f2$ are employed to represent items of information to be transmitted over a transmission link and the frequency $f3$, which may be referred to as a synchronizing frequency, is interspersed words constituted by a predetermined number of items of information.

The format of transmission of the frequencies $f1$, $f2$ and $f3$ for a particular group of items of information or word is illustrated typically in FIG. 1 at the first line "*a*." It will be seen that in the present embodiment there are 18 items of information in each word and the words are separated by six-item periods during which the synchronizing frequency $f3$ is transmitted.

Figures 2, 3:
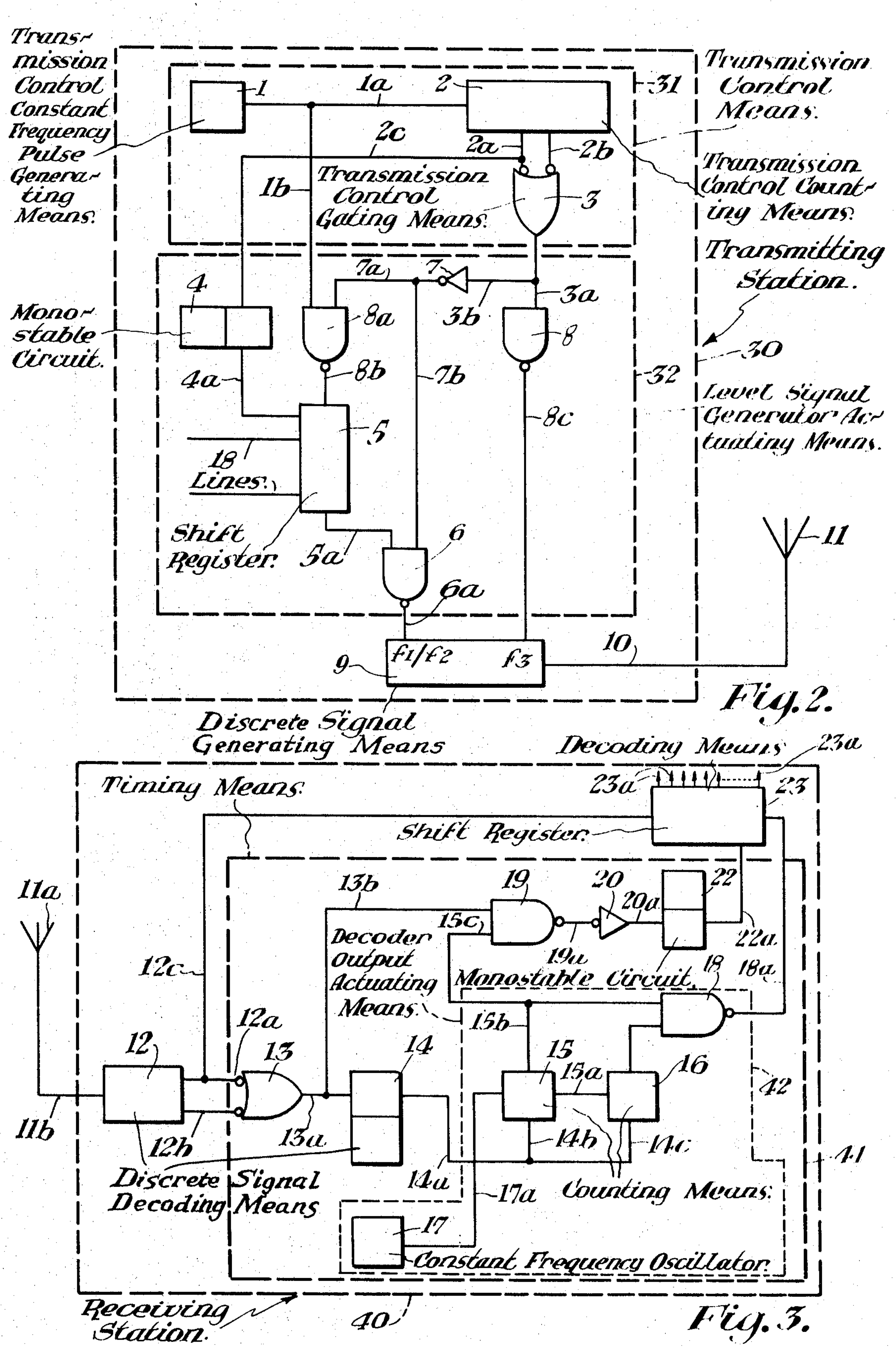
FIG. 2 illustrates in schematic logical form a preferred embodiment of transmission equipment at a transmitting station.
FIG. 3 illustrates in logical schematic form a preferred embodiment of the reception apparatus at a receiving station.

Referring now to FIG. 2, at the transmitting station 30, a transmission control constant frequency generator means is represented by the block 1 and the output 1*a* of this device is applied to a transmission control counting means represented by the block 2, which counter in this preferred embodiment cycles once for every 24 input pulses. Hence the transmission control counting means 2 has counting periods which may be designated periods T0, T1, .............T23. Corresponding to an output 2*a* of the transmission control counting means 2, for the periods T0 to T3, there is an input to a transmission control gating means shown as "OR" gate 3 and corresponding to the output 2*b* of transmission control counting means 2, for the periods T22 to T23, there is a further input to the "OR" gate 3. The cooperative embodiment of the transmission control constant frequency generating means 1, the transmission control counting means 2, and the transmission control gating means 3 constitutes a transmission control means 31. The input 2*a* to the gate 3 which is also a first output from the transmission control means 31 is also applied to a monostable circuit 4 via lead 2*c* which on receiving an input signal produces a read pulse input on lead 4*a* to a shift register 5. The shift register 5 has accommodations for 18 items of information and means, not shown, is provided by well-known techniques for parallel read-in of these items of information into the register 5. The output 5*a* of the register 5 which as will be seen hereafter is a serial output, is applied to one input of gate 6 and is controlled by the output 8*b* of a gate 8*a* having two inputs, the first of which is the output on lead 1*b* produced by the transmission control constant frequency generating means 1, which output on lead 1*b* is also a second output from the transmission control means 21. The second input to gate 8*a* is derived from inversion circuit 7 via lead 7*a*. The second input to gate 6 is also derived from inversion circuit 7 via lead 7*b*. The inversion circuit 7 is connected to the output 3*a* of the "OR" gate 3 via lead 3*b* which output of "OR" gate 3 is also a third output of the transmission control means 31. The output 3*a* of the "OR" gate 3 is also connected via 1 gate 8 through lead 8*c* to one input of a discrete signal generating means which in this embodiment is a frequency shift transmitter 9. A further input to the frequency shift transmitter 9 corresponding to items of information is derived from the gate 6 via lead 6*a*. The monostable circuit 4, the shift register 5, the gate 6, the inversion circuit 7, the gate 8 and the gate 8*a*, cooperatively constitute a level signal generator actuating means 32. The output of the frequency shift transmitter 9 is connected via a connection 10 to a transmission antenna 11 which connects the transmitting station 30 to a receiving station 40 to be discussed with reference to FiG. 3.

Referring now to FIG. 3, the antenna 11 transmits the discrete signals produced at a transmitting station 30 The counter 15 receiving station 40 via receiving antenna 11*a* and particularly to a first, second and third discrete signal detecting means which in this embodiment is a conventional frequency modulation receiver represented by the block 12 having two outputs on lines 12a and 12b, each capable of providing a normal binary output. These outputs are connected as inputs to an "OR" gate 13, the output 13a of which is applied to a monostable circuit 14 arranged to produce a reset signal on output 14a to a pair of conventional electronic counters 15 and 16 respectively via leads 14b and 14c. The counter 15 derives its input 17a from a substantially constant frequency oscillator device represented by the block 17 and for every 16 input pulses to the counter 15, an output is applied from counter 15 as an input to the counter 16 on lead 15a. The counter 15 furthermore has an output on lead 15b corresponding to binary counts of 4 and 12 which output 15b is applied to an "AND" gate 18. The counter 16 has an output corresponding to a binary count of 9 also applied to the gate 18 via lead 15c. The gate 18 has a check output 18a to be referred to hereafter. The output 15b *of the counter 15 corresponding to counts of four* (4) and twelve (12) is also applied to an "AND" gate 19 via the lead 15c, the other input of "AND" gate 19 being derived from the input to the monostable circuit 14 via lead 13b. The output 19a of the gate 19 is applied via output lead 20a of an inversion circuit 20 to a monostable device 22 which, as will be seen hereafter, provides shift pulses on lead 22a for a decoding device, which in this embodiment is a conventional shift register 23 which receives a data input from one output 12c of the receiver 12 and is also electrically connected to gate 18 via lead 18a. The gate 13, the monostable circuit 14, the counters 15 and 16, the constant frequency oscillator 17, the gate 18, the gate 19, the inversion circuit 20, and the monostable circuit 22, all cooperatively constitute a timing means 41.

Referring now to the operation of the system, the constant frequency oscillator device 1 in FIG. 2 which is a transmission control constant frequency pulse generating means produces an output on lead 1a appearing as an input to the counter 2 and on occurrence of the periods T0 to T3, the front edge of the output signal from the counter 2 is applied to the monostable circuit 4 via leads 2a and 2c which provides a read-in pulse to the register 5 via lead 4a. Thereupon read-in in parallel fashion of the 18 bit word of information is effected into the register 5. The input pulses to the counter 2 are also applied via lead 1b to the gate 8a but since no input is present on the other input at lead 7a of this gate at this time, no shift signals are applied to the register 5 during the periods T0 to T3 and no data input is applied from the gate 6 to the transmitter 9. However, during these periods an input is applied to the other input of the transmitter 9 via gate 8 through lead 8c and the transmitter 9 therefore transmits the frequency *f3*. During the periods T4 to T21, no input is applied to the gate 3 and the gates 8a and 6 are therefore operable to shift out items of information serially from the register 5 and cause transmitter 9 to transmit the frequency *f1* or *f2* according to whether the items of information are "0" or "1" digits. During the periods T22 to T23, an input is again applied to the "OR" gate 3 via lead 26 and therefore gate 8a and 6 are closed and gate 8 is opened to cause the frequency *f3* to again be transmitted to represent the end of a transmitted word.

Referring now to the operation of the receiving station in FIG. 3, the train of frequencies is received by the receiver 12 through receiving antenna 11a and lead 11b and the input signal is demodulated to provide a binary output on the lead 12a representing a binary "0" when frequency *f1* is received, a binary "1" being present on lead 12a otherwise when frequency is received, and a binary output "0" on the line 12b when the frequency *f2* is received, a binary "1" being present on lead 12b otherwise when the frequency *f1* is received. The waveforms appearing on lines 12a and 12b are shown at line "*b*" and line "*c*" respectively, in FIG. 1. It will be seen that via the "OR" gate 13, an input represented by the waveform "*d*" of FIG. 1 is applied to one input of the "AND" gate 19 via leads 13a and 13b. The front edge of the waveform "*d*" is further sensed by the monostable circuit 14 via lead 13a to produce a reset pulse 45 as represented on line "*e*" in FIG. 1, to the counters 15 and 16 via lead 14a and respectively leads 14b and 14c. The counter 15 is driven continuously by the constant frequency oscillator 17 through lead 17a and after being reset to zero by the reset pulse 45 it begins to count the next pulse received from oscillator 17. Since this pulse is in no way synchronized with the incoming data there is an indeterminacy of one clock period as to when it will arrive, but since the frequency of oscillator 17 is preferably eight times that of the incoming items of information, the total error in sampling time is minimal.

The output of 15b of the counter 15 is, as mentioned above, decoded for the binary conditions corresponding to counts of 4 and 12 and this produces information sampling pulses as shown in waveform "*g*" of FIG. 1. This input via leads 15b and 15c together with the other input via lead 13b from gate 13 to the gate 19 operates the sampling monostable device 22 through inversion circuit 20 to clock the received information on line 24 into the shift register 23. The counter 16 is operated by the counter 15 through lead 15a every time the counter 15 attains a count of fifteen (15) as shown in waveform "*h*" of FIG. 1. When the counter 16 attains a count of nine (9), all of the received items of information are normally registered in shift register 23 and a check on validity can be made. This check is achieved by examining the contents of the register 23 when the counter 16 is at the count of nine (9 ) and the counter 15 is at the state corresponding to a count of twenty-four (24). The output 18a of the gate 18 as shown in waveform "*i*" of FIG. 1 can therefore be employed to initiate a parity check as well as parallel readout from the shift register 23 on decoder outputs 23a in any suitable known manner, for example, as shown by lead wire 18a to the shift register 23. The constant frequency oscillator 17, the counters 15 and 16, and the gate 18 cooperatively constitute a decoder output actuating means 42.

It will be noted that in the foregoing no mention has been made in relation to FIG. 3 of reception of the transmitted frequency *f3* in the intervals between the transmitted groups of items or words. A separate receiver may be provided for detecting the frequency *f3* if desired and the response of this receiver may be employed to prove continued operation of the system in interword periods and a reset to monostable circuit 14 may be arranged to be responsive to transitions from the frequency *f3* to one or other of frequencies *f1* or *f2* if desired. It will be appreciated, however, that essentially it is the interruption of the transmitted items for the transmission of frequency *f3* for example which enables the synchronization to be reestablished at the commencement of each transmitted word. More particularly, the presence of the characterized frequency *f3* at the lead 11b which is input to receiver 12 will cause a binary zero to appear on each of leads 12a and 12b. Accordingly, the "OR" gate 13 will produce a binary zero on output 13a, which output 13a is electrically connected to monostable circuit 14. Hence the monostable circuit 14 will be responsive to the next succeeding positive going pulse, which pulse will appear at the start of a new word. The counters 15 and 16 will be reset accordingly.

It will be appreciated that while antennae have been incorporated in the present transmission system, other suitable transmission media, such as a transmission line, may be incorporated without departing from the inventive concept.

While from the point of view of basic considerations, it may appear that in the above proposal, the frequency *f3* may be unnecessary, a period when nothing is transmitted being employed for timing, a continuously transmitted carrier signal is very desirable in practice. Firstly, it can enable the signal level on the line to be readily monitored both for maintenance purposes and continuous line proving. Secondly, the presence of a continuous carrier can enable filter ringing problems with an intermittent carrier to be avoided such as to avoid a necessity for additional circuit components and increased scanning times. Thirdly, a frequency modulation receiver is substantially more susceptible to interference when no input signal is present then when it is receiving a normal input signal.

Thus, it is apparent that the new and improved information transmission system of the present invention provides a more effective and electronically unique method for transmitting items of message information from one location to another location which minimizes signaling time and reduces transmission error.

Having thus described my invention, what I claim is:

1. An information transmission system for communicating items of message information from a transmitting station to a receiving station, wherein said transmitting station includes a transmitter having a transmitted output, a. said transmitter including a first, second and third discrete signal generating means, said first and said second discrete signals representative of said message information, said third discrete signal indicative of the start and the end of a message, said discrete signal generating means electrically controllingly coupled to said transmitter output to thereby provide a transmitted signal having a format comprised of at least two null of message information portions thereof consisting of said third discrete signal and one message portion thereof consisting of one or more of said first and second discrete signals, said message portion of said format appearance interspersed said null of message information portions, b. a receiving station having means to receive said transmitted signal, said receiving means including first, second, and third discrete signal detecting means having an input, and a decoding means having a decoder output and electrically coupled to the output of a timing means and to said first, second, and third discrete signal detecting means to receive said first and second discrete signals, from said first, second and third discrete signal generating means, c. said decoding means responsive to said first and second discrete signals from said first, second and third discrete signal generating means to provide said message information, said receiving station maintained in tuned synchronization with said transmitted signal by said third discrete signal, to thereby provide maximum signaling speed within the discrete signal range, d. said transmitter further includes a transmission control means having first, second and third outputs, e. said first, second, and third outputs of said transmission control means cooperatively controlling the presence of said first and said second discrete signal on said transmitter output, f. said third output of said transmission control means controlling the presence of said third discrete signal on said transmitter output, g. said first, second and third outputs of said transmission control means are electrically coupled to a discrete signal generator actuating means, said discrete signal generator actuating means having first and second outputs electrically coupled to said discrete signal generator means, such that whenever a signal appears on said first output from said discrete signal generator actuating means, said discrete signal generating means will selectively provide said first or said second discrete signal on said transmitter output in accordance with said signal on said first output of said discrete signal generator actuating means, and whenever a signal appears on said second output of said discrete signal generator actuating means said discrete signal generator will provide said third discrete signal on said transmitter output.

2. The information transmission system of claim 1 wherein said transmission control means includes in combination a. transmission control constant frequency pulse generator means having a constant pulse width output, b. transmission control counting means having an input and first and second outputs, said input of said transmission control counting means electrically coupled to said constant pulse width output of said transmission control constant frequency pulse generator means to count a predetermined number of pulses from said constant pulse-width output of said transmission control constant frequency pulse generator means, said predetermined member comprising one message cycle, a signal being present on said first output from said transmission control counting means during the counting of a predetermined initial number of said pulses in said message cycle from said constant pulse-width output of said transmission control frequency generator means, a signal being present on said second output from said transmission control counting means during the counting of a predetermined final number of said pulses in said message cycle from said constant pulse-width output of said transmission control constant frequency generator means, c. a transmission control gating means having a first and a second input and an output, said first and said second inputs of said transmission control gating means respectively electrically coupled to said first and said second outputs of said transmission control counting means, said output of said transmission control gating means being produced whenever a signal appears on either of said first or said second outputs of said transmission control counting means, said first output of said transmission control counting means being said first output of said transmission control means, said constant pulse-width output of said transmission control constant frequency generator means being said second output of said transmission control means, and said output of said transmission control gating means being said third output of said transmission control means.

3. The information transmission system of claim 1 wherein said timing means at said receiving station includes a decoder output actuating means to provide said timing means output, said timing means output appearing at the end of said message portion of said format to produce said decoder output, said decoder output actuating means synchronized due to the presence of said third discrete signal at said first, second and third discrete signal detecting means input and operable to allow reception of a next succeeding message by said decoding means.